April 4, 1961 T. JENSEN 2,978,007
BREAD WRAPPER SEALING DEVICE
Filed March 31, 1959 3 Sheets-Sheet 3
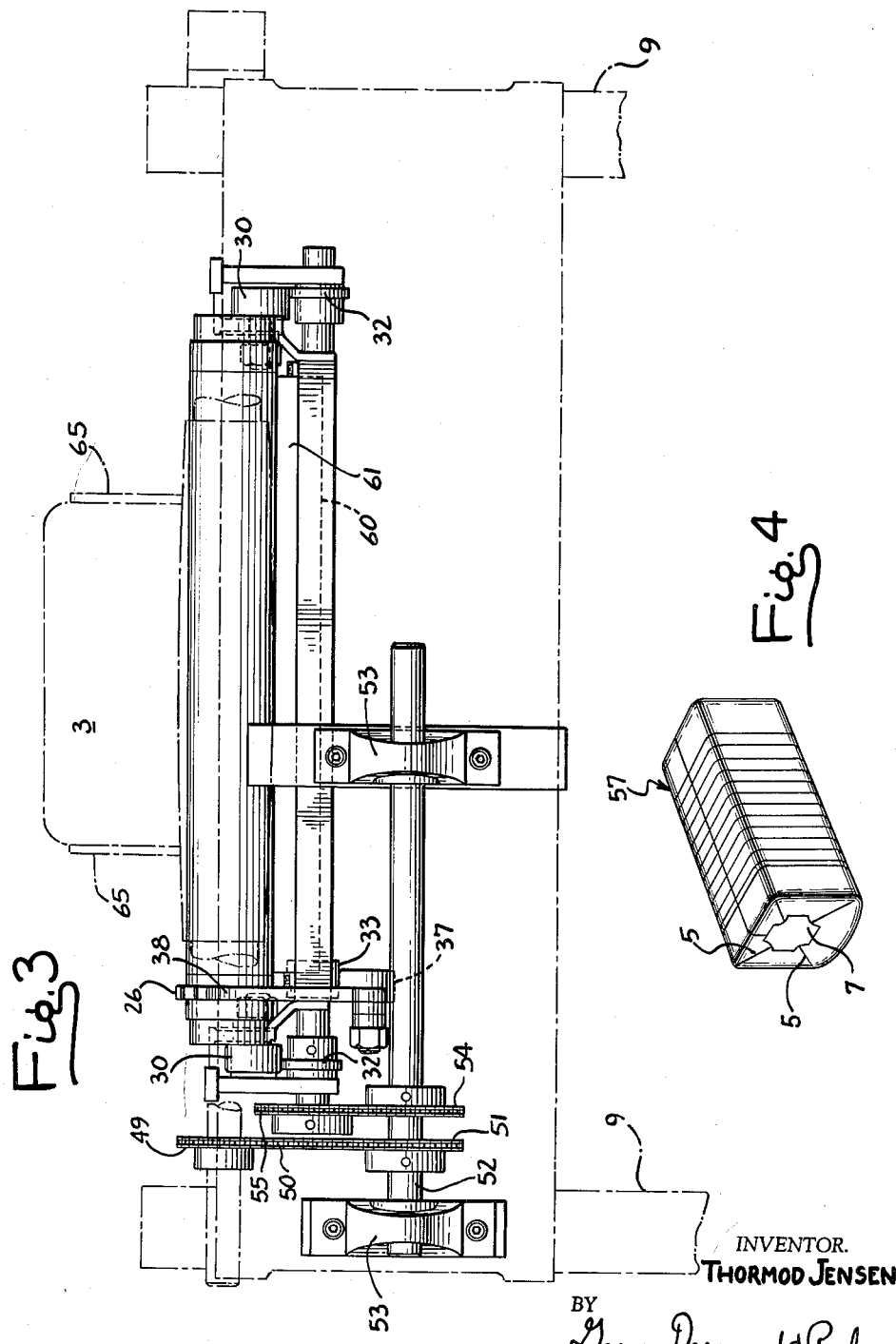
INVENTOR.
THORMOD JENSEN
BY
Cary, Desmond & Parker
ATTYS

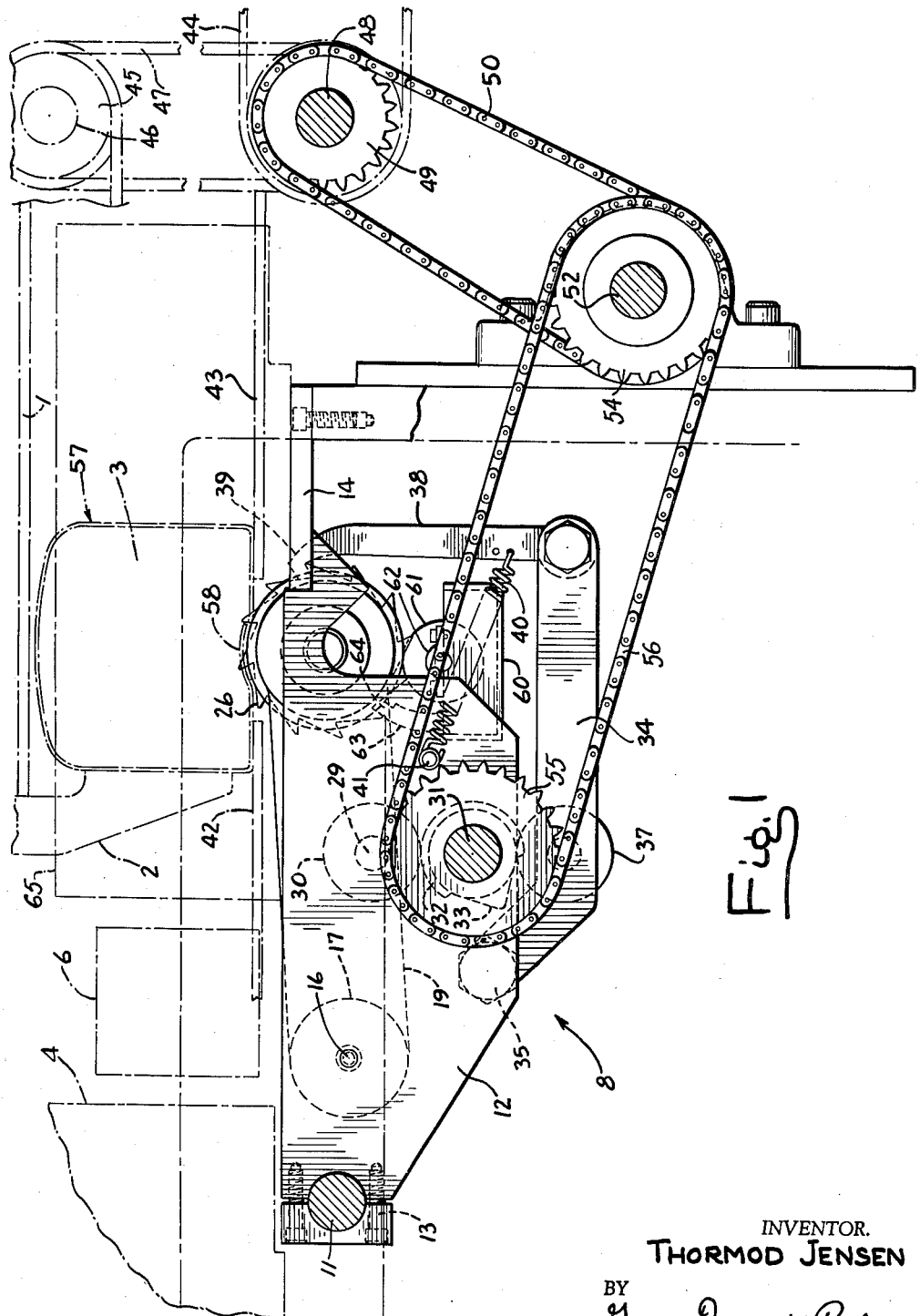

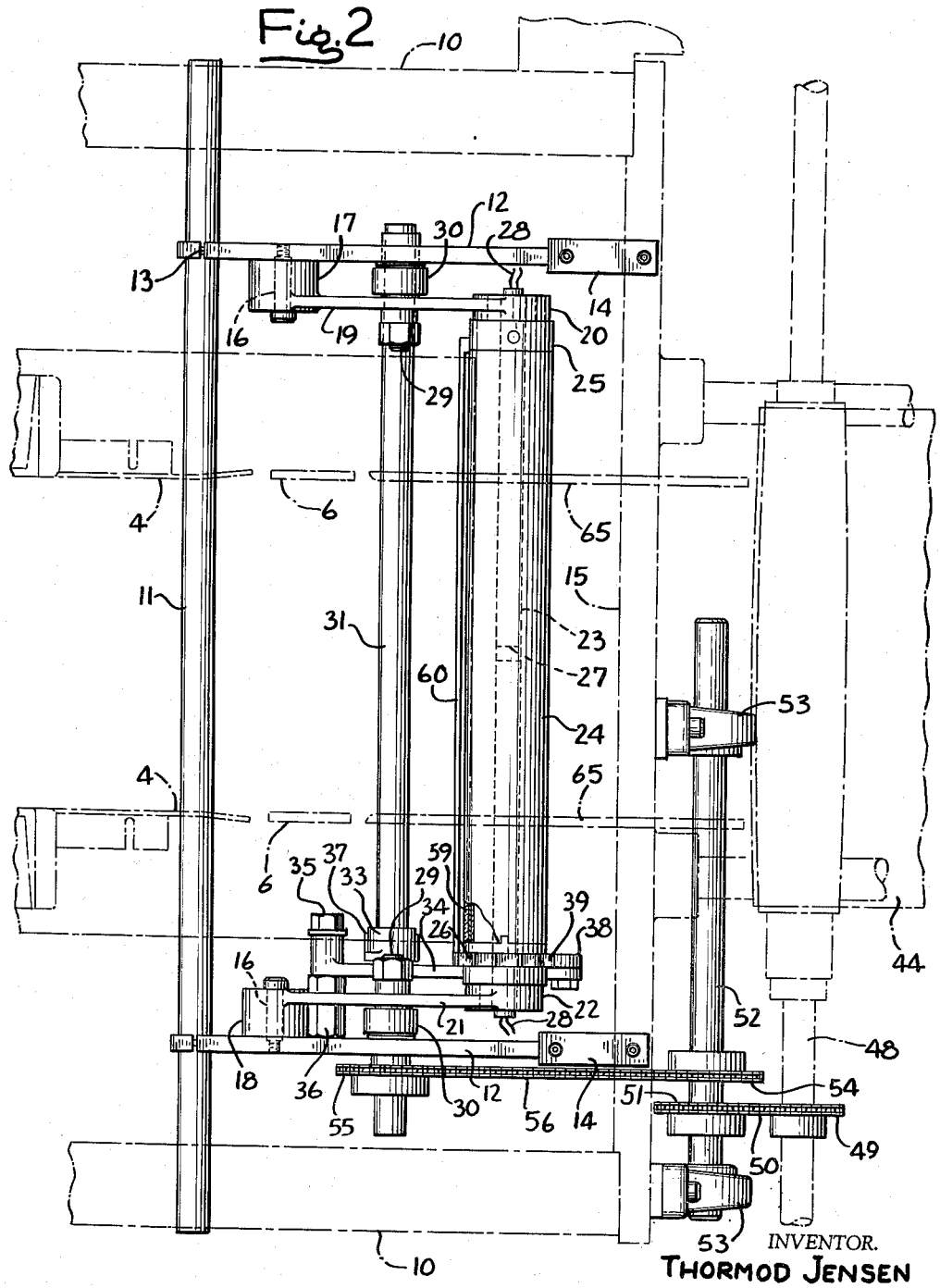

2,978,007
BREAD WRAPPER SEALING DEVICE

Thormod Jensen, New York, N.Y., assignor to St. Regis Paper Company, New York, N.Y., a corporation of New York Filed Mar. 31, 1959, Ser. No. 803,281

7 Claims. (Cl. 154—42)

This invention relates to improvements in a sealing device and refers particularly to a sealing device for heat sealing overlapped edge portions of a polyethylene bread wrapper, particularly a so-called "window wrapper."

In the type of bread wrapper known to the art as a window wrapper, the wrapper comprises a composite sheet of wrapping material comprising polyethylene sheet material and waxed paper adhesively united thereto. The window wrapper comprises a central portion of substantially transparent polyethylene to which is adhesively united edge portions of waxed paper. When the wrapper is positioned on the bread loaf to wrap the same, the polyethylene sheet covers the transverse central portion of the loaf and the waxed paper covers the opposite end portions of the loaf.

The end portions of the wrapper being of waxed paper are folded and sealed in the manner well known in the wrapping of bread with waxed paper, and in most cases an end seal is applied to the end folds in the conventional manner.

However, at the bottom of the loaf the polyethylene portion of the window wrapper must be heat sealed, and the sealing must be accomplished in a manner different from the manner in which the waxed paper flaps are sealed to each other.

The present invention relates to a device for accomplishing the sealing of the seam at the bottom of the loaf where the polyethylene edge portions overlap each other to form a longitudinal bottom seam.

One of the important features of the present invention resides in a heated sealing member which comprises a cylinder which is covered with a sleeve of a Teflon (tetrafluoroethylene resin) impregnated glass fiber which provides a surface which can be readily released and will not stick to the polyethylene being sealed.

Another important feature of the invention resides in a mechanism for periodically rotating said sealing cylinder or roll so that after each sealing operation performed upon an individual loaf, the sealing roll is rotated through an angle to present a fresh sealing surface to the succeeding loaf.

A further important feature of the present invention resides in the provision of means for applying a lubricating medium, preferably a silicon oil, to the surface of the sealing roller during its periodic movements.

An additional feature of the invention resides in a cleaning means for removing dirt or burnt particles of polyethylene from the sealing roll surface during its periodic movements, said means also functioning to doctor the oil film carried by the roll.

Other objects, advantages and features of the present invention will be apparent from the accompanying drawings and following detailed description.

In the drawings,

Fig. 1 is a side elevational view of the improved sealing device embodying the concepts of the present invention, the device comprising a portion of a conventional bread wrapping machine.

Fig. 2 is a top plan view of the device shown in Fig. 1 on a slightly reduced scale.

Fig. 3 is an end elevational view of the device shown in Fig. 1 on a slightly reduced scale.

Fig. 4 is a perspective view of a loaf of bread wrapped by a window wrapper.

The device comprising the present invention may be employed as a portion of a conventional bread wrapping machine. Accordingly, in showing and describing the present invention, only those portions of the conventional machine which are intimately related to the present device will be shown.

Referring in detail to the drawings and with specific reference to Fig. 1, 1 indicates an endless chain carrying spaced lugs 2 comprising a portion of a conventional bread wrapping machine, the chain being driven by conventional power means (not shown), and as the chain is driven each lug 2 pushes a loaf of bread 3 forward over the wrapping machine. The reference numeral 4 indicates a fragmentary portion of one folding plate, a plurality of which are used, to fold and seal the waxed paper end flaps 5, shown in Fig. 4, and the numeral 6 indicates a plate which may apply one of the end seals 7. After the bread loaves are passed through that portion of the machine which folds and seals the end flaps and applies the end seals, if such are used, the loaves are passed in seriatim to the bottom sealing device 8 comprising the present invention.

The device 8 is supported by the frame of the wrapping machine and specifically, upon standards 9 and side frame members 10. A rod 11 is carried by side frame members 10 and extends transversely across the machine. A plate 12 is secured to rod 11, by screws 13 or the like, at each end portion of the rod, each plate being positioned inwardly of each opposite side frame 10. The opposite end of each plate 12 is secured to an attachment plate 14 which secures each plate 12 to a transverse frame member 15.

A pin or stub shaft 16 is secured to each opposite plate 12 and functions as journals for collars 17 and 18 which are pivotally mounted upon said pins. Collar 17 carries or is carried by an arm 19, the opposite end of which carries a collar 20. Collar 18, in similar fashion, is integral with a similar arm 21 which, at its opposite end, carries a collar 22, similar to collar 20. A shaft 23 is journaled at its opposite ends in the opposite collars 20 and 22 and a sealing roll 24 is carried by said shaft. One end of roll 24 is spaced from collar 20 by a spacer 25 and the opposite end of the roll is keyed to a ratchet wheel 26. By means hereinafter more fully described, the sealing roll 24 is caused to swing about the projected axes of the pins 16 and is also caused to be rotated by the ratchet wheel 26.

Shaft 23 is hollow and carries one or more electric heating units 27 in its hollow interior, said units being energized from a suitable source of electric current by means of conductors 28. The flow of current through the heating units is thermostatically controlled by suitable thermostats (not shown) which may be associated with the heating units and the roll 24.

A stub shaft 29 is carried intermediate the length of each arm 19 and 21 and a cam follower roller 30 is pivotally mounted on each stub shaft. A cam shaft 31 is journaled at its opposite end portions in each plate 12 and a pair of cams 32 are mounted on said cam shaft beneath each arm follower roller 30. Thus, the opposite arms 19 and 21, and, hence, sealing roller 24, are supported upon the cams 32.

The arrangement is such that as cam shaft 31 is rotated, by means hereinafter more fully described, the cams 32, each of which have a high portion and a low portion, raise and lower sealing roll 24, that is, said roll is rocked about the projected axes of pins 16 relative to the top of the machine, that is, that portion upon which the loaves 3 travel.

The cam shaft 31 also carries a cam which carries a relatively steep projecting lobe 33, as shown best in Fig. 1, said lobe being angularly displaced with respect to the high portion of cam 32. A pawl-carrying arm 34 is pivotally carried upon the plate 12 adjacent arm 21, said pawl-carrying arm being pivoted on pin 35. A spacer 36 embraces pin 35 and spaces said pawl-carrying arm inwardly from the plate 12 upon which it is mounted. Intermediate the length of the pawl-carrying arm 34, a cam follower roller 37 is pivotally mounted and is adapted to ride upon cam 33.

At the free end of the pawl-carrying arm 34, a pawl 38 is pivotally mounted, said pawl having a hooklike engaging end portion 39 which engages with the teeth of the ratchet wheel 26. A coil spring 40 is anchored at one end upon pawl 38 and at its opposite end upon pin 41 carried by the adjacent plate 12. The spring, which is normally in tension, performs two functions, it urges follower roller 37 into riding contact with cam 33, and urges the hook-like end portion 39 of pawl 38 into operative contact with the ratchet wheel 26.

When the bread loaves are moved in seriatim through the wrapping machine, they are supported and slide upon a supporting plate, a continuation of which is shown at 42 in Fig. 1. The plate 42 is broken adjacent the sealing roll 24 for the protrusion of said roll 24 upwardly into contact with the overlapping wrapper at the bottom of the bread loaf. Thereafter the loaf is passed to discharge plate or bridge 43 which permits the transfer of the loaves to discharge conveyor 44.

To drive the various moving elements in timed relationship, which is essential, as will be hereinafter more fully described, a sprocket wheel 45 may be carried upon shaft 46 which carries the sprocket wheel over which chain 1 is trained. A sprocket chain 47 is trained around sprocket wheel 45 and is also trained around a sprocket wheel mounted on shaft 48 which shaft also carries a terminal roll over which the discharge conveyor 44 is trained. A sprocket wheel 49 is also mounted upon shaft 48 and a chain 50 trained around sprocket wheel 49 drives sprocket wheel 51 mounted upon a jack shaft 52. The jack shaft 52 is journaled in spaced bearing 53 carried upon a portion of the frame of the machine. A second sprocket wheel 54 is mounted upon the jack shaft 52 and drives sprocket wheel 55 carried by cam shaft 31, sprocket chain 56 being trained around sprocket wheels 54 and 55.

Thus, the moving elements of device 8 are moved in timed relationship with the remaining portion of the wrapping machine, particularly with chain 1 which controls the passage of bread loaves 3 over the bottom sealing device 8.

In the operation of the device 8 thus far described, as chain 1 moves forwardly at its lower pass, lugs 2 engage individual loaves of bread 3 which are embraced by a composite wrapper 57. The end flaps 5 of the wrapper comprising waxed paper are folded and sealed together and the end labels 7 are applied when each loaf reaches the device 8. The cam shaft 31, by means of the chain and sprocket wheel drives, hereinbefore described, moves in timed relationship with the movement of the loaves.

As a loaf 3 moves over the position of roll 24, the high portion of cams 32 engaging the cam follower rollers 30 cause the roll 24 to move upwardly, arms 19 and 21 being rocked in a counterclockwise direction, as viewed in Fig. 1. Hence, a portion of the surface of the heated sealing roll 24 contacts the overlapping bottom seam of the wrapper, as shown best at 58 in Fig. 1 and causes said overlapped portions of the polyethylene sheet to be sealed together. Such sealing action takes place as long as the follower rollers 30 ride on the high portions of cams 32. The arcuate lengths of the high portions of cams 32 are correlated to the degree of the overlap 58 so that the full overlap will be sealed.

When the follower rollers 30 leave the high portions of cams 32, the high portion of cam 33, also carried on cam shaft 31, comes into contact with follower roller 37. At this period, the arms 19 and 21 have rocked, by gravity, in a clockwise direction, as viewed in Fig. 1, and roll 24 is below the path of travel of the bread loaf 3. Upon contacting the high portion or lobe of cam 33, lever 34 is rocked in a clockwise direction about pivot pin 35 pulling the pawl 38 downwardly, as viewed in Fig. 1. By virtue of the engagement of the hooklike end portion 39 of pawl 38 which is in engagement with a tooth of ratchet wheel 26, the ratchet wheel is rotated, thereby rotating sealing roll 24. A fresh sealing surface is thereby presented upwardly to engage the longitudinal seam of the next loaf being carried forwardly. Of course, when the follower roller 37 rides off of the lobe of cam 33, spring 40 causes lever 34 to rock in a counterclockwise direction, as viewed in Fig. 1, and pawl 38 moves upwardly causing the hooklike end 39 to engage another tooth of ratchet wheel 26 preparatory for the next rocking cycle.

It has been found in one construction of the device 8 that for an overlapped seam of two inches in width, a sealing roll 24 of two and one-half inches in diameter, a 30° throw of the ratchet wheel 26 per one revolution of cam shaft 31 is suitable, that is, twelve fresh areas of the roll 24 are presented for sealing per revolution of the sealing roll 24. Of course, the invention is not to be limited to these specific constants of operation, since they may be varied, as desired.

As has been hereinbefore described, the sealing roll preferably carries a sleeve 59 (Fig. 2) of glass fibers impregnated with Teflon (tetrafluoroethylene resin). It has been found that this type of surface when heated has a minimum tendency to adhere to the heated polyethylene sheet comprising a portion of the bread wrapper.

To further reduce the possibility of adherence or sticking of the polyethylene to the sealing roll 24, the surface of said roll is coated by means to be hereinafter described, with a film of oil, preferably a silicone oil which can readily withstand the heat of the roll 24. The oil film thus carried by the roll tends to further prevent adherence of the polyethylene and the roll surface.

To apply the oil to the surface of the roll 24, an open top vat or trough 60 is carried at its ends upon the inner walls of the opposite plates 12. A roll 61 journaled in bearings 62 is carried at the mouth of the vat and a portion of its surface dips into a bath of oil carried in said trough. As the sealing roll 24 is rotated, that is, at its lowered position, it contacts the surface of the roll 61 which, during the rotation of roll 24, applies an oil film to the surface of the latter roll.

To control the thickness of the oil film so applied, a wick support 63 is carried upon trough 60, said wick support carrying a relatively resilient wick 64 which doctors or rubs upon the surface of roll 24 during its rotation. The wick 64 in addition to doctoring the oil film on roll 24, removes any dirt, burnt polyethylene particles or the like which may have accumulated on the sealing roll surface.

Of course, roll 61 is substantially coextensive in length with the active length of roll 24, as is also the wick 64, so that the entire working length of roll 24 may be operated on. Properly to guide the bread loaves through the device 8, guide plates 65 may be employed, which are virtual continuations of the elements 4 and 6 of the conventional portion of the wrapping machine.

It is to be understood that many modifications of the present invention may be made by anyone skilled in the art, particularly with regard to the timing of the machine to accommodate loaves traveling at different spaced relationship and also with respect to the shapes and angular spans of the high portions of the cams 32 and 33. Hence, it is not intended that the invention be specifically limited to the exact details shown and described, except as necessitated by the appended claims.

Although the device embodying the concepts of the present invention has been described in conjunction with the sealing of window wrappers, particularly with respect to the sealing of polyethylene to polyethylene, it is to be understood that the broad concepts of the invention contemplate the sealing of wrappers of any type which require heat sealing, such as conventional wax wrappers, cellophane or the like.

I claim as my invention:

1. A device for heat-sealing the bottom overlapping edge portions of a thread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a peripheral surface circumscribing its said axis and comprising a plurality of surface areas sequentially engageable respectively with the overlapping portions of the wrappers of the forwardly moving series of loaves, first cam means mounted on said frame and operatively engaging said bracket, said first cam means having a cam portion accommodating disposition of the surface of said sealing member in spaced relation to the path of movement of the loaves and another cam portion for moving said bracket to dispose one of the said surface areas of said member in the path of movement of the loaves, second cam means mounted on said frame and operatively connected with said sealing member for periodically rotating said member a predetermined fraction of one revolution to dispose in sequence the said surface areas thereof for engagement with the overlapping portions of the wrappers of the forwardly moving series of loaves, and means for operating said cam means in timed relationship with one another and said loaf-moving means for sequentially swinging said sealing member into the path of movement of the loaves to engage one surface area thereof with the overlapped portions of the wrapper of a first loaf, swinging said sealing member out of the path of movement of the loaves, rotating the member a fraction of a revolution while moving the series of loaves to remove the first loaf from the vicinity of said member and to bring a second loaf into the vicinity of said member, swinging said member into the path of movement of the loaves to engage a second surface area thereof with the overlapped portions of the wrapper of the said second loaf.

2. A device for heat-sealing the bottom overlapping edge portions of a bread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a peripheral surface circumscribing its said axis and comprising a plurality of surface areas sequentially engageable respectively with the overlapping portions of the wrappers of the forwardly moving series of loaves, a cam shaft journalled on said frame, a first cam mounted on said shaft and operatively engaging said bracket, said first cam having a cam portion accommodating disposition of the surface of said sealing member in spaced relation to the path of movement of the loaves and another cam portion for moving said bracket to dispose one of the said surface areas of said member in the path of movement of the loaves, a second cam mounted on said shaft and operatively connected with said sealing member, said second cam having a cam portion aligned with the first-named cam portion of said first cam for rotating said member a predetermined fraction of one revolution to dispose in sequence the said surface areas thereof for engagement with the overlapping portions of the wrappers of the forwardly moving series of loaves, and means for rotating said cam shaft in timed relationship with said loaf-moving means for sequentially swinging said sealing member into the path of movement of the loaves to engage one surface area thereof with the overlapped portions of the wrapper of a first loaf, swinging said sealing member out of the path of movement of the loaves, rotating said sealing member a fraction of a revolution while moving the series of loaves to remove the first loaf from the vicinity of said member and to bring a second loaf into the vicinity of said member, swinging said sealing member into the path of movement of the loaves to engage a second surface area thereof with the overlapped portions of the wrapper of the said second loaf.

3. A device for heat-sealing the bottom overlapping edge portions of a bread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a peripheral surface circumscribing its said axis and comprising a plurality of surface areas sequentially engageable respectively with the overlapping portions of the wrappers of the forwardly moving series of loaves, a cam shaft journalled on said frame, a first cam mounted on said shaft and operatively engaging said bracket, said first cam having a cam portion accommodating disposition of the surface of said sealing member in spaced relation to the path of movement of the loaves and another cam portion for moving said bracket to dispose one of said surface areas of said member in the path of movement of said loaves, a ratchet surface on said sealing member, a pawl engaging said ratchet surface and swingably mounted on said frame, a second cam mounted on said shaft and operatively connected with said pawl, said second cam having a cam portion aligned with the first-named cam portion of said first cam for swinging said pawl to rotate said member a predetermined fraction of one revolution to dispose in sequence the said surface areas thereof for engagement with the overlapping portions of the wrappers of the forwardly moving series of loaves, and means for rotating said cam shaft in timed relationship with said loaf-moving means for sequentially swinging said sealing member into the path of movement of the loaves to engage one surface area thereof with the overlapped portions of the wrapper of a first loaf, swinging said member out of the path of movement of the loaves, rotating the member a fraction of a revolution while moving the series of loaves to remove the first loaf from the vicinity of said member and to bring a second loaf into the vicinity of said member, and swinging said member into the path of movement of the loaves to engage a second surface area thereof with the overlapped portions of the wrapper of the said second loaf.

4. A device for heat-sealing the bottom overlapping edge portions of a bread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a peripheral surface circumscribing its said axis and comprising a plurality of surface areas sequentially engageable respectively with the overlapping portions of the wrappers of the forwardly moving series of loaves, first cam means mounted on said frame and operatively engaging said bracket, said first cam means having a cam portion accommodating disposition of the surface of said sealing member in spaced relation to the path of movement of the loaves and another cam portion for moving said bracket to dispose one of the said surface areas of said member in the path of movement of the loaves, second cam means mounted on said frame and operatively connected with said sealing member for periodically rotating said member a predetermined fraction of one revolution to dispose in sequence the said surface areas thereof for engagement with the overlapping portions of the wrappers of the forwardly moving series of loaves, a lubricant distributing member mounted on said frame adjacent said sealing member, said sealing member when spaced from the path of movement of the loaves engaging said distributing member on a surface area thereof spaced from the surface area then disposed for engagement with the loaf, and means operating said cam means in timed relationship with one another and said loaf-moving means for sequentially swinging said sealing member into the path of movement of the loaves to engage one surface area thereof with the overlapped portions of the wrapper of a first loaf, swinging said sealing member out of the path of movement of the loaves into engagement with said distributing member, rotating said sealing member a fraction of a revolution while engaged with said distributing member, moving the series of loaves to remove the first loaf from the vicinity of said sealing member and to bring a second loaf into the vicinity of said sealing member, and swinging said sealing member into the path of movement of the loaves to engage a lubricated second surface area thereof with the overlapped portions of the wrapper of the said second loaf.

5. A device for heat-sealing the bottom overlapping edge portions of a bread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a peripheral surface circumscribing its said axis and comprising a plurality of surface areas sequentially engageable respectively with the overlapping portions of the wrappers of the forwardly moving series of loaves, first cam means mounted on said frame and operatively engaging said bracket, said first cam means having a cam portion accommodating disposition of the surface of said sealing member in spaced relation to the path of movement of the loaves and another cam portion for moving said bracket to dispose one of the said surface areas of said member in the path of movement of the loaves, second cam means mounted on said frame and operatively connected with said sealing member for periodically rotating said member a predetermined fraction of one revolution to dispose in sequence the said surface areas thereof for engagement with the overlapping portions of the wrappers of the forwardly moving series of loaves, a lubricant distributing member mounted on said frame adjacent said sealing member, doctor means adjacent said distributing and sealing members and disposed rearwardly of said distributing member relative to the direction of rotation of said sealing member, said sealing member when spaced from the path of movement of the loaves engaging said distributing member and said doctor means on surface areas thereof spaced from the surface area then disposed for engagement with the loaf, and means operating said cam means in timed relationship with one another and said loaf-moving means for sequentially swinging said sealing member into the path of movement of the loaves to engage one surface area thereof with the overlapped portions of the wrapper of the first loaf, swinging said sealing member out of the path of movement of the loaves into engagement with said distributing member and said doctor means, rotating said sealing member a fraction of a revolution while engaged with said distributing member and said doctor means thereby to lubricate and clean the surface of said sealing member, moving the series of loaves to remove the first loaf from the vicinity of said sealing member and to bring a second loaf into the vicinity of said sealing member, swinging said sealing member into the path of movement of the loaves to engage a lubricated and cleaned second surface area thereof with the overlapping portions of the wrapper of the said second loaf.

6. A device for heat-sealing the bottom overlapping edge portions of a polyethylene window in a window bread wrapper wrapped on a loaf of bread which comprises, a frame, means for moving wrapped loaves of bread forwardly in a given path seriatim on said frame, a bracket swingably mounted on said frame for movement toward and away from the path of movement of the loaves, a heated sealing member mounted on said bracket for rotation about its central axis, said sealing member having a periphearl surface circumscribing its said axis and comprising a plurality of surface areas sequentially engageable respectively with the overlapping portions of the wrappers of the forwardly moving series of loaves, said surface areas each comprising glass fibers impregnated with a tetrafluoroethylene resin, a cam shaft journalled on said frame, a first cam mounted on said shaft and operatively engaging said bracket, said first cam having a cam portion accommodating disposition of the surface of said sealing member in spaced relation to the path of movement of the loaves and another cam portion for moving said bracket to dispose one of the said surface areas of said member in the path of movement of the loaves, a ratchet surface on said sealing member, a pawl engaging said ratchet surface and swingably mounted on said frame, a second cam mounted on said shaft and operatively connected with said pawl, said second cam having a cam portion aligned with the first-named cam portion of said first cam for swinging said pawl to rotate said member a predetermined fraction of one revolution to dispose in sequence the said surface areas thereof for engagement with the overlapping portions of the wrappers of the forwardly moving series of loaves, a lubricant distributing member mounted on said frame adjacent said sealing member, doctor means adjacent said distributing and sealing members and disposed rearwardly of said distributing member relative to the direction of rotation of said sealing member, said sealing member when spaced from the path of movement of the loaves engaging said distributing member and said doctor means on surface areas thereof spaced from the surface area then disposed for engagement with the loaf, and means rotating said cam shaft in timed relationship with said loaf-moving means for sequentially swinging said sealing member into the path of movement of the loaves to engage one surface area thereof with the overlapped portions of the polyethylene window of the wrapper of a first loaf, swinging said sealing member out of the path of movement of the loaves into engagement with said distributing member and said doctor means, rotating said sealing member a fraction of a revolution while engaged with said distributing member and said doctor means thereby to lubricate and clean the surface of said sealing member, moving the series of loaves to remove the first loaf from the vicinity of said sealing member and to bring a second loaf into the vicinity of said sealing member, and swinging said sealing member into the path of movement of the loaves to engage a lubricated and cleaned second surface area thereof with the overlapped portions of the window of the wrapper of the said second loaf.

7. A device for heat-sealing the bottom overlapping edge portions of a bread wrapper on a wrapped loaf of bread which comprises, a frame, means for moving wrapped loaves of bread forwardly in a given path seriatim on said frame, a bracket swingably mounted on said frame for movement toward and away from the path of movement of the loaves, a heated sealing member rotatably mounted on said bracket, first cam means mounted on said frame and operatively engaging said bracket, said first cam means having a portion accommodating disposition of said sealing member in spaced relation to the path of movement of the loaves and another portion for moving said bracket to dispose said member in the path of movement of the loaves, second cam means mounted on said frame and operatively connected with said sealing member for periodically rotating said member, a sealing member conditioning means mounted on said frame adjacent said sealing member, said sealing member when spaced from the path of movement of the loaves engaging said conditioning means, and means operating said cam means in timed relationship with one another and said loaf-moving means for sequentially swinging said sealing member into the path of movement of the loaves to engage the same with the overlapped portions of the wrapper of a first loaf, swinging said member out of the path of movement of the loaves into engagement with said conditioning means, rotating the member while engaged with said conditioning means and while moving the series of loaves to remove the first loaf from the vicinity of said member and to bring a second loaf into the vicinity of said member, and swinging said member into the path of movement of the loaves to engage the same with the overlapped portions of the wrapper of the said second loaf.

References Cited in the file of this patent

UNITED STATES PATENTS

| | | |
|---|---|---|
| 1,883,229 | Bent | Oct. 18, 1932 |
| 2,591,383 | Spalding | Apr. 1, 1952 |

FOREIGN PATENTS

| | | |
|---|---|---|
| 412,402 | Great Britain | June 28, 1934 |